March 1, 1966  J. L. SUTTON  3,238,284
FILM MANUFACTURE
Filed Sept. 30, 1963
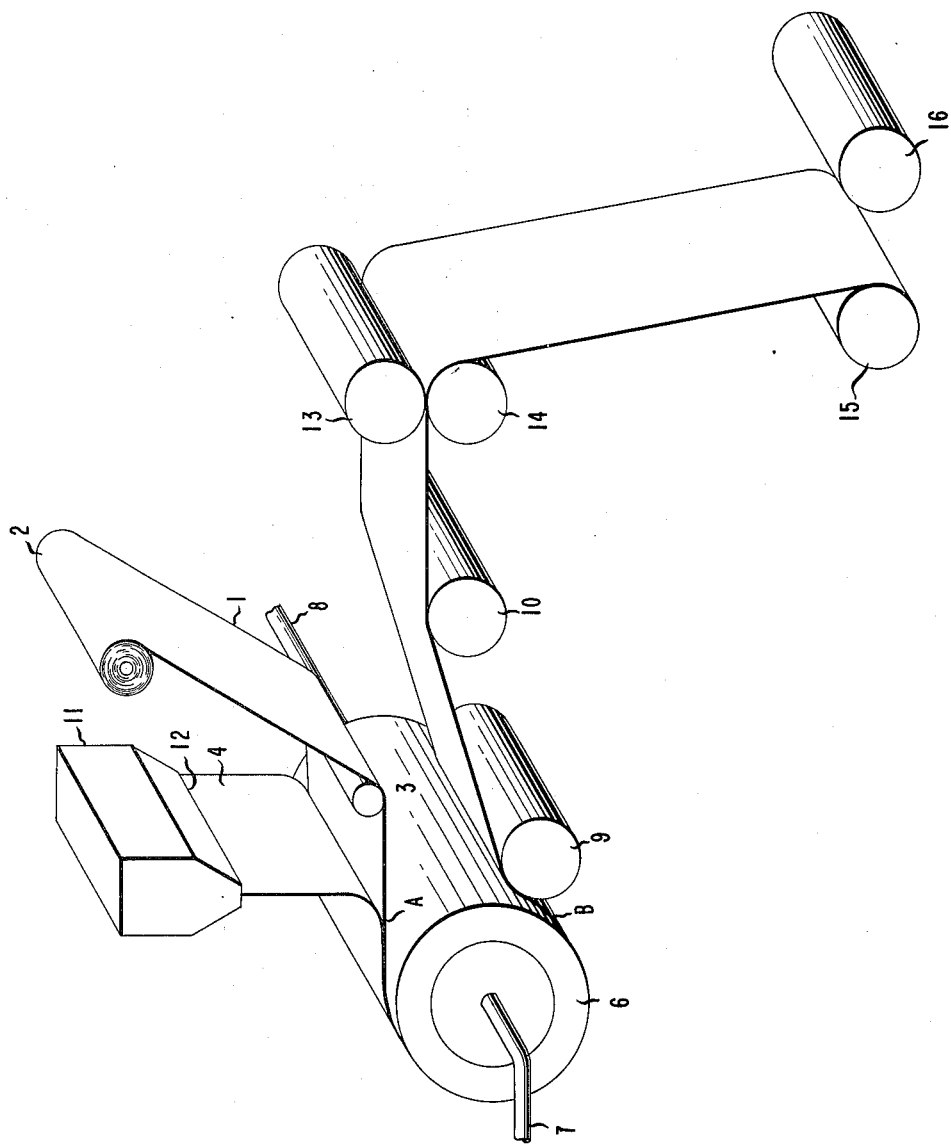
INVENTOR
JAMES L. SUTTON
BY *Herbert M Wolfson*
ATTORNEY

United States Patent Office 3,238,284
Patented Mar. 1, 1966

3,238,284
FILM MANUFACTURE
James L. Sutton, Circleville, Ohio, assignor to E. I. du Pont de Nemours and Company, Wilmington, Del., a corporation of Delaware
Filed Sept. 30, 1963, Ser. No. 312,612
2 Claims. (Cl. 264—216)

This invention relates to the preparation of organic thermoplastic polymers in the form of thin films. More particularly, the invention relates to the melt-extrusion of polyester films, e.g., polyethylene terephthalate films.

The method for preparing polyethylene terephthalate films involves extruding material while it is molten through the orifice of a flat extrusion die. After extrusion, the resulting molten polyethylene terephthalate film is passed through a minimum air space and is cast upon a moving quenching member such as a cooled drum or roll or belt, etc., where the film is cooled sufficiently to solidify it.

Several difficulties are encountered in this process, particularly in starting up such a process. Starting up or, as called by those in this field, "casting off," requires leading a substantially molten mass issuing from the orifice onto a cooled quenching surface. Besides holding together as a molten film, it is necessary that the film should not slip off the surface of the quenching member prematurely. Furthermore, the film should not stick to the quenching surface so tightly that stripping after it has solidified is prevented.

An object of the present invention is to overcome the difficulties encountered during casting off. Other objects will appear hereinafter.

The objects are accomplished by extruding a molten, thermoplastic, film-forming polymeric material (a polyester such as polyethylene terephthalate) in the form of a thin film onto a moving sheet of oriented, heat-set polyethylene terephthalate film; passing the sheet of oriented, heat-set polyethylene terephthalate film carrying the substantially molten polyethylene terephthalate film onto a moving quenching surface, preferably starting at the point of extrusion; maintaining contact of the oriented, heat-set polyethylene terephthalate film with the moving quenching surface until the substantially molten film is sufficiently solidified to be self-supporting and the path of the molten film to the quenching surface is established; and, thereafter, severing the oriented, heat-set polyethylene terephthalate film at a point prior to the point of first contact of this film with the moving quenching surface, to permit the substantitally molten polyethylene terephthalate film to be extruded directly onto the moving quenching surface.

In the process wherein the molten, film-forming ethylene terephthalate polymer is extruded in the form of a thin film onto a rotating cylindrical quench roll maintained at a temperature sufficiently low to cause the extruded polymeric film to solidify, the present invention comprises initiating the extrusion of the molten polymer downwardly onto a continuously moving oriented heat-set polyethylene terephthalate film, the film being passed continuously from an independent source roll into intimate contact with the periphery of the cylindrical quench roll at a point directly below the orifice of the extrusion die; allowing the oriented, heat-set polyethylene terephthalate sheet with the extruded polymer in the form of a thin film adhered to its upper surface to remain in contact with the rotating cylindrical quench roll through an arc of about 270°; stripping the combination of the oriented, heat-set polyethylene terephthalate sheet and the extruded polymer from the roll by means of a stripping roll; and conveying them to a wind-up roll and, upon reaching desired extruded conditions, severing the oriented polyethylene terephthalate film along a bias line between the source roll and the point of first contact with the rotating quench roll, thereby allowing the molten polyethylene terephthalate to be extruded directly onto the rotating quench roll.

The invention will be more fully described with reference to the accompanying drawing wherein FIGURE 1 is a view in perspective of the preferred mode of carrying out the process of this invention.

Referring to the drawing, prior to the initiation of extrusion of the molten polyethylene terephthalate film 4 from the extrusion hopper 11 through orifice 12, polyethylene terephthalate film 1 of any thickness ranging between 0.5 to 10 mils, which has been oriented by stretching at least 2.5 times its initial dimensions in both the longitudinal and transverse direction and heat-set at a temperature between 150–230° C. in a manner such as described in Scarlett U.S. Patent 2,823,421 or Winter U.S. Patent 2,995,779, is wound from source roll 2, passed underneath as idler roll 3 and conducted around the periphery of a quench roll 6 from a point A directly below the extrusion orifice 12 to a strip-off point B 270° around the periphery of the quench roll 6. The film is passed over a strip-off roll 9 idler roll 10 and between the nips of tension isolator rolls 13 and 14 to wind-up roll 15. Prior to initiating the flow of polymer from the extruder, the quench roll 6 and wind-up rolls 15 and 16 are activated and regulated at the desired speed by motors not shown. The oriented polyethylene terephthalate film 1 is unwound and then becomes a continuously moving belt to carry the extruded film to the quench roll. When all conditions for the final stage of quenching are met, extrusion of the molten polyethylene terephthalate 4 from the extrusion orifice 12 is started, usually at a temperature of 260° C.–280° C., the polymer dropping down upon the moving oriented polyethylene terephthalate film 1. Upon contacting the oriented polyethylene terephthalate film 1 on the quench drum 6, the polymer is quenched and formed into a thin film that is fused to the oriented film. The composite of the cast, substantially amorphus polyethylene terephthalate film 4 upon the oriented polyethylene terephthalate film 1 traverses the periphery of the quench drum 6 to the strip-off point B 270° around the drum and is stripped off. The composite of the quenched film 4 and the oriented film 1 is led to roll 15 where it is continuously wound-up.

The casting-off operation is completed by severing the oriented polyethylene terephthalate film 1 on the bias in order to maintain the continuous flow of the extruded film 4 to and around the quench roll 6. Cutting the carrier film 1 on the bias serves to remove the carrier gradually. This type of cutting also prevents curling of the cut edge of the carrier film which would tend to disturb the smooth flow of the extruded film onto the quench roll.

After the initial roll containing the composite sheet of stretched and cast film as well as cast film alone, is completely filled, the roll may be rewound on a second wind-up roll so that the composite portion of the roll may be removed and sent to be chipped into flake for re-entry into the polymerization process. Alternatively, after the last of the composite has been wound on roll 15, the film may be severed at the wind-up location and the subsequent cast film wound on roll 16.

It has been found that it is essential that the film utilized as the conveying means for casting off polyethylene terephthalate film be oriented, heat-set polyethylene terephthalate film. Other thermoplastic films either do not have a sufficiently high melting point (the molten extrudate will melt through the film), or do not have sufficient tensile strength and stiffness (modulus) to successfully utilize the film in the quenching process. Furthermore, by using polyethylene terephthalate film as the conveying means, it is possible to recover both the stretched and cast film which make up the initial composite sheet and to re-utilize these materials in future polymerization cycles. This eliminates a significant waste of material and results in substantial savings.

What is claimed is:

1. A process which comprises extruding molten polyethylene terephthalate in the form of a thin film onto a moving sheet of oriented, heat-set polyethylene terephthalate film; passing the sheet of oriented, heat-set polyethylene terephthalate film carrying the substantially molten polyethylene terephthalate film onto a moving quenching surface; maintaining contact of the oriented, heat-set polyethylene terephthalate film with the moving quenching surface until the substantially molten film is sufficiently solidified to be self-supporting and the path of the molten film to the quenching surface is established; and, thereafter, severing the oriented, heat-set polyethylene terephthalate film at a point prior to the point of first contact of this film with the moving quenching surface, to permit the substantially molten polyethylene terephthalate film to be extruded directly onto the moving quenching surface.

2. In a process wherein a molten, film-forming ethylene terephthalate polymer is extruded in the form of a thin film onto a rotating cylindrical quench roll maintained at a temperature sufficiently low to cause the extruded polymeric film to solidify, the improvement which comprises initiating the extrusion of the molten polymer downwardly onto a continuously moving, oriented, heat-set polyethylene terephthalate film, the film being passed continuously from an independent source into intimate contact with the periphery of the cylindrical quench roll at a point directly below the orifice of the extrusion die; allowing the oriented, heat-set polyethylene terephthalate sheet with the extruded polymer in the form of a thin film adhered to its upper surface to remain in contact with the rotating cylindrical quench roll through an arc of about 270°; stripping the combination of the oriented, heat-set polyethylene terephthalate sheet and the extruded polymer from the roll; and conveying them to a wind-up roll and, upon reaching desired extruded conditions, severing the oriented polyethylene terephthalate film along a bias line between the source and the point of first contact with the rotating quench roll, thereby allowing the molten polyethylene terephthalate to be extruded directly onto the rotating quench roll.

No references cited.

ALEXANDER H. BRODMERKEL, *Primary Examiner.*